Nov. 1, 1960 F. A. MONAHAN 2,958,147

CHEMICAL MILLING APPARATUS

Filed Nov. 30, 1956

INVENTOR.
FREDERICK A. MONAHAN

BY Walter J. Jason
ATTORNEY

United States Patent Office 2,958,147

Patented Nov. 1, 1960

2,958,147

CHEMICAL MILLING APPARATUS

Frederick A. Monahan, La Mesa, Calif., assignor to General Dynamics Corporation, San Diego, Calif., a corporation of Delaware Filed Nov. 30, 1956, Ser. No. 625,495

8 Claims. (Cl. 41—9)

The present invention relates to a novel method and apparatus for chemically milling or etching metallic material and more particularly to a method and apparatus for shielding desired areas of a work-piece to restrict and control the action of the chemical agent during the chemical milling operation in order to effect desired design configurations.

Machining or etching of metallic parts customarily requires immersion of the parts in a chemical bath. However, preparation of the parts for the etchant bath involves one particularly time-consuming and relatively expensive operation. This operation entails the careful masking or coating of those areas of the work-piece which must be protected against the action of the etchant. The mask or coating consists of a material which is resistant to the etchant and this material is sprayed, painted, taped or otherwise carefully applied or adhered to those areas of the work-piece which must not be etched. Each work-piece, in the usual chemical milling operation, must be individually handled and treated with a protective coating arranged in a particular design dictated by the configuration to be produced. After the application of the protective coating the work-piece is placed in the chemical bath for a predetermined period of time to etch the exposed areas to a desired depth. It is characteristic of this method of chemical etching, wherein protective coatings are applied or formed on the work-piece, that as the etchant attacks the exposed portions, it undercuts the material of the work-piece at the edges of the mask to a distance substantially equal to the total depth of the etch. That is, if the depth of the etch is one-half an inch, the material will be undercut from the edge of the mask substantially the same amount to form substantially a one-half inch radius or fillet at the bottom of the etch. If a different radius or a vertical wall is desired, subsequent machining operations are necessary.

An object of the present invention is to provide a novel method of, and apparatus for, shielding portions of a workpiece during a chemical milling operation to direct the action of a chemical agent to produce a part having a desired configuration.

Another object of this invention is to provide shielding apparatus of unique construction which serves in connection with the chemical milling of a part to produce structural shapes and configurations which satisfactorily meet desired design requirements and which require little or no subsequent machining operations after the etchant operation.

Another object of this invention is to provide in a chemical milling operation a novel form of protective shield, having a predetermined shape which is adapted for progressive movement relative to a work-piece to mask the particular areas thereof required to be protected against the attack of the etchant to produce a desired configuration for the work-piece.

Another object of this invention resides in providing a protective shield of the character above which is adapted to be made in a multiplicity of forms to produce a wide variety of shapes, contours and configurations of metallic parts.

Another object of this invention lies in providing a protective shield of the character above which is adapted for repetitive use where parts of like construction are required and which eliminates the necessity of separately handling and adhering a coating to each individual part.

A further object of this invention is to provide a novel form of protective shield for use in a chemical milling operation which is efficient in operation, produces parts with very desirable accuracy, is adapted to quantity production work, is economical, and is of durable and reliable construction.

Other objects and features of the present invention will be readily apparent to those skilled in the art from the following specification and appended drawings wherein is illustrated a preferred form of the invention, and in which.

Figures 1, 2:
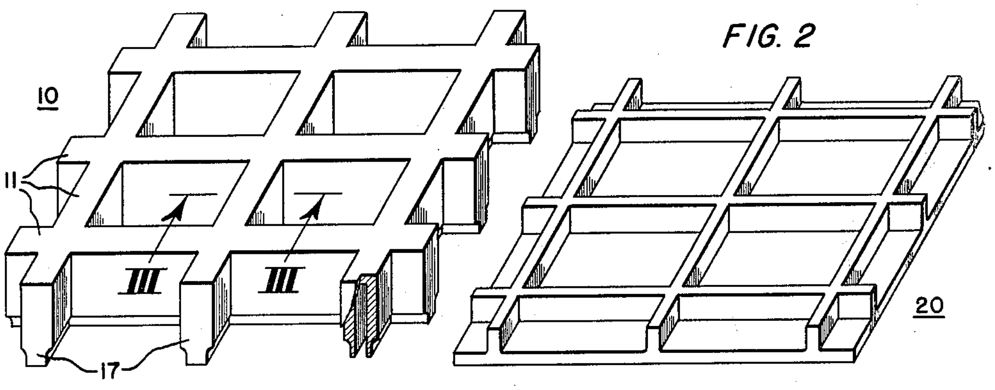
Figure 1 is a perspective view of one form of protective shield in accordance with the present invention.
Figure 2 is a perspective view of a structural part chemically milled with the use of the protective shield of Figure 1.

Referring now to the drawings, Figure 1 illustrates a protective shield embodying the present invention and designated generally in its entirety by the numeral 10. Protective shield 10 exemplifies a form which may be taken by the present invention, which form here is generally egg-crate in configuration. This configuration is generated by the shape of the part to be chemically milled as will be discused more fully hereinafter.

Shield 10 comprises a body member formed of a plurality of channel members 11 suitable rigidly interconnected in inter-crossed relationship. The various channel members 11 are formed of an end portion 12 and integral, spaced legs or walls 13 which define a cavity 14. The ends of the walls 13 are beveled as at 15 but having the outer edge or rim 16 thereof provided with a flat, planar surface for a purpose to be described. The cavities 14 of the various channel members 11 are interconnected to open into one another, there are no internal partitions between the cavity of one channel and that of another. However, to complete shield 10 the opposite extremities of each straight-line cavity run are sealed by end closures 17, the closures 17 being suitably affixed as by welding or brazing.

The shield 10 illustrated in Figure 1, it is to be understood, is only an example of a form which may be employed in the present invention. The particular outline provided to a shield is dictated by the design of the part to be chemically milled. Figure 2 illustrates the appearance of a part, indicated generally by the numeral 20, which is produced by the use of shield 10. Shield 10, accordingly, will be designed into that conformation which is necessary to effect a required part having a particular configuration.

Shield 10 may be made of any suitable material which is impervious or made impervious to the action of the chemical agent. It could be made of molded rubber or of molded plastic or it could be formed of metal which is sprayed or otherwise coated with a suitable etchant impervious lacquer or with an impervious plastic film, or with any suitable commercially available masking material which would not be affected by the etching fluid.

The shield 10 will be usually employed in a tank containing an etching solution into which the work-piece to be milled is immersed. Any suitable etching solution may be employed in the tank to perform the milling operation. This etching solution may be of either an alkaline or acid type dependent on the particular metal of the work-piece to be etched. If the metal is aluminum, for example, then a suitable caustic such as sodium hydroxide may be used. It is understood that the present invention does not extend to the composition of any particular etchant since the invention contemplates the use of any suitable, commercially available chemical agent.

In carrying out the milling operation the shield 10 may be first suitably fitted to the work-piece to be etched with the various flat edge surfaces 16 resting firmly upon the upper surface of the work-piece and thereafter the assembly is immersed in an etchant bath, provided in a suitable tank 22. Pressure is then evenly applied to the shield 10 through any usual pressure means, not shown. Such pressure means may be of a hydraulic nature, or pneumatic, or may embody arrangements which include resilient force applying means such as springs. The particular manner and the particular apparatus for affording pressure upon the shield 10 do not form a part of the present invention since any suitable pressure device or arrangement is contemplated.

Figures 3, 4, 5:
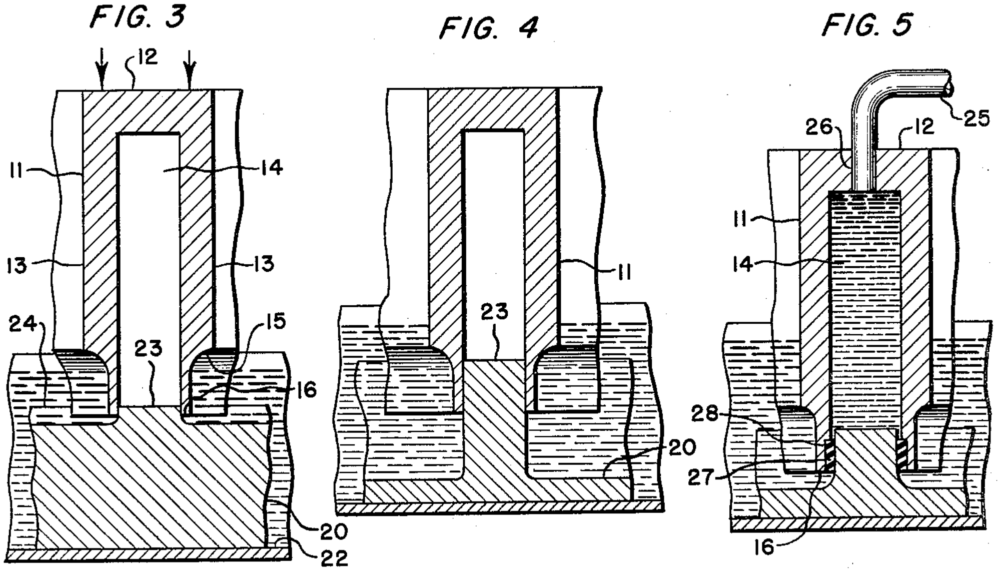
Figure 3 is an enlarged sectional view taken along the line III—III of Figure 1 and in addition showing the association of the shield with a work-piece to be milled by the action of a chemical etchant.
Figure 4 is a sectional view similar to Figure 3 but illustrating the work-piece after the conclusion of a milling operation and with the shield in the process of being withdrawn.
Figure 5 is a sectional view of another modification wherein fluid is employed in connection with the protective shield.

Figures 3 and 4 illustrate the formation of a stiffening rib 23 of part 20 by the use of shield 10 of Figure 1. Figure 3 shows the relative positions of the shield 10 and the work as the etching operation is in progress and Figure 4 shows the shield 10 in a partially withdrawn position after rib 23 has been formed. In the formation of rib 23, channel 11 of shield 10 was initially positioned on the upper surface 24 of the work-piece 20 with the flat lower edge surfaces 16 of legs 13 pressed thereagainst. As the etchant attacks the work-piece 20 material under the flat surfaces 16 becomes undercut but the portion of the work-piece surface between legs 13 remains unaffected since it is shielded from the etchant. Under the pressure applied to shield 10, shield 10 moves downwardly, with the legs 13 moving into the undercut, at a rate equivalent to the chemical action of the etchant upon the work-piece thereby forming straight, shear, vertical walls of rib 23. The width of the rib 23, as is apparent from the drawings, is determined by the space provided between the legs 13. If larger or smaller widths are desired it is necessary only to provide a shield having the legs thereof spaced apart the appropriate amount. Since the amount of the undercut is equal to the thickness of walls 13 at the flat lower surfaces 16 the fillet radius at the bottom of the etched out area of part 20 will also be equal thereto. If larger fillet radii are desired they are effected by increasing the wall thicknesses at the lower ends 16. Thus the size of the fillet radius is independent of the total depth of the cut made into the work-piece, i.e., the height of the rib 23, but is related to the thickness of the leg portions 16 at their lowermost ends.

In the movement of shield 10 downwardly rib 23 as it is being formed enters cavity 14. This will result in entrapment and compression of the air within the cavity, which compressed air has the tendency to exclude the etching solution from the cavity and prevent seepage along the formed walls of rib 23 protecting them against further chemical attack.

After the milling operation the shield 10 and workpiece are removed from the etchant bath and the work-piece immersed in a suitable etchant neutralizing bath to assure against further chemical attack.

In the modification of Figure 5 the cavity 14 of the channel member 11 is filled with a suitable non-etchant fluid such as water or oil which is led from a reservoir, not shown, through a usual conductor 25. Conductor 25 connects with cavity 14 through an opening 26 provided in end 12 of the channel member and permits the flow of liquid in both directions between the cavity and the reservoir. A sealing member 27 made of any suitable material such as rubber is positioned in grooves 28 formed in the interior surfaces of the defining walls of cavity 14 adjacent the lower ends of such walls. Sealing member 27 is suitably secured in its grooves as by an adhesive and assists in preventing the chemical etchant from continuing its attack on the formed walls of the chemically milled work-piece portion which projects into the cavity. If desired, a suitable gas under pressure may be substituted for the water or oil in cavity 14.

Figure 6:
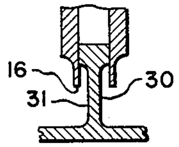
Figures 6, 7 and 8 are sectional views illustrating various typical shapes and configurations which may be produced with the use of protective shields embodying the present invention.

Figure 6 illustrates a typical configuration which may be obtained with the present process. In Figure 6 a rib 30 has been formed having a reduced thickness web portion 31. In the formation of this rib it is desirable first to mill the rib in the same manner as rib 23 of Figures 3 and 4 was formed to provide a straight, vertical walled preliminary formation. Shield 10 is then moved upon the rib to a position corresponding to the height desired for the web. The shield 10 is retained in this position for the interval of time required to reduce the rib to the web thickness desired. This time interval is determined by such factors as the strength of the etching solution and temperature, which factors of course are known to the operator and are within his control. After the web has been formed the work-piece is desirably removed to a neutralizing bath for cleaning away any etchant which may be clinging thereto.

Figure 7:
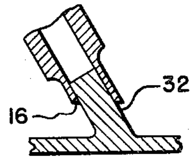
Figure 8:
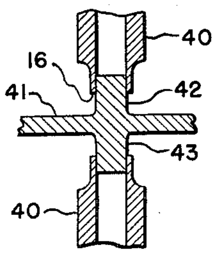

Figures 7 and 8 illustrate typical configurations which may be effected by variations in the shape of the protective shield employed in the present process. In Figure 7 a slanted or angled rib 32 is formed by the use of a shield wherein the channel portion is slanted and is moved angularly to the work-piece as the chemical attack takes place. Figure 8 shows the use of a pair of shields 40 simultaneously operable on opposite sides of a work-piece 41 to form a pair of ribs 42 and 43. In this use the work-piece is sandwiched between the two shields which are operatively connected to any suitable actuating devices for effecting simultaneous movement of the shields toward each other during the milling operation. Each of the shields 40 operates to form ribs 42 and 43 in the same manner that the single shield 10 functioned to form rib 23 of Figures 3 and 4.

The process and apparatus above described may be employed to mill a variety of metals such as aluminum, magnesium, steel or titanium and may be used on flat or curved surfaces. Should the surfaces be curved the protective shield will be also suitably curved to conform thereto so as to present appropriately located flat edge surfaces which cooperate to define areas which will be protected from the action of the etching solution.

It is understood that the shield is not confined to the use of parallel spaced apart leg members but that it may be modified to form various configurations in the surface to be milled. If the required part is to have arcuate walls then a channel with arcuate walls, conforming to the design of the part to be formed, is used. The shield may be constructed to form a few or to form many elevations in a work-piece and these elevations, as stated, may differ in shape one from another in accordance with a predetermined design. There is no limitation as to size or complexity of configurations obtainable. Knowing the final appearance of a part to be chemically milled it is necessary only to construct a shield having the appropriate number of flat surfaces appropriately located relative to each other to define areas of appropriate configurations to be protected which will result in the designed configurations needed for the part.

A distinct advantage of the present invention is its applicability to and efficacy in repetitive work. It is apparent that as soon as one part is chemically milled the shield may be immediately transferred to another work-piece and the operation repeated. There is no need to prepare the other work-piece by painstakingly masking off areas required to be protected.

While certain preferred embodiments of the present invention have been shown and described, variations will be readily apparent to those skilled in the art and the invention is to be given its broadest possible interpretation within the terms of the following claims.

What I claim is:

1. A chemical milling apparatus for milling a metallic work-piece comprising a shield having a body member impervious to a chemical etchant, said body member having wall portions depending from a closed end, said wall portions arranged in predetermined relationship one to the other to define an area on the work-piece which will be protected from chemical attack, and edge surfaces on said wall portions adapted to be pressed against said work-piece in surrounding relationship to said defined area, said closed end and said wall portions defining a cavity opening only to said defined area of said work-piece, said shield and said work-piece being immersed in a chemical etchant whereby said cavity receives a progressively increasing portion of said work-piece conforming in outline to said defined area.

2. A chemical milling apparatus for milling a metallic work-piece comprising a shield having a body member impervious to a chemical etchant, said body member having a plurality of wall portions depending from associated closed end portions arranged in predetermined relationship one to the other to define areas of desired configurations on the work-piece which will be protected from chemical attack, and peripheral edge surfaces on said wall portions adapted to be pressed against said work-piece in surrounding relationship to said defined areas, said edge surfaces conforming in contour to the contour of the work-piece where pressed thereagainst, said closed end portions and said wall portions defining cavities opening only to said defined areas of said work-piece, said shield and said work-piece being immersed in a chemical etchant whereby said cavities receive progressively increasing portions of said work-piece as such milled portions are formed.

3. A chemical milling apparatus for milling raised integral portions on a metallic work-piece comprising a shield having a bodily movable solid member impervious to the effects of a chemical etchant, said solid member having a plurality of dependent wall portions, said wall portions arranged in predetermined relationship to each other to define areas of desired configurations on the work-piece which will be protected from chemical attack, flat peripheral edge surfaces on said wall portions adapted to be pressed against a flat surface of said work-piece, and surface portions of said solid member cooperating with said wall portions to define cavities opening only to said defined areas of said work-piece, said shield and said work-piece being immersed in a chemical etchant whereby said cavities receive progressively increasing formations of said work-piece conforming in outline to said defined areas.

4. A chemical milling apparatus for milling raised integral formations on a metallic work-piece comprising a shield having a bodily movable solid member impervious to the effects of a chemical etchant, said solid member having a plurality of dependent wall portions, said wall portions arranged in predetermined relationship to each other to define areas of desired configurations on the work-piece which will be protected from chemical attack, said wall portions being of a different thickness at their lower ends and having edge surfaces at such lower ends, which edge surfaces are adapted to be pressed against said work-piece in surrounding relationship to said defined areas, said edge surfaces conforming in contour to the contour of the work-piece where pressed thereagainst, and surface portions of said solid member cooperating with said wall portions to define cavities opening only to said defined areas of said work-piece, said shield and said work-piece being immersed in a chemical etchant whereby said cavities receive progressively increasing formations of said work-piece conforming in outline to said defined areas.

5. A chemical milling apparatus for milling raised integral formations on a metallic work-piece comprising a shield having a bodily movable member impervious to the effects of a chemical etchant, said member having a plurality of cavities, each open at but one end, said openings being of predetermined configurations, said member having wall portions defining said cavities, said wall portions having peripheral edge surfaces adapted to be pressed against said work-piece in surrounding relationship to areas thereof to be protected from chemical attack, such areas conforming in configurations to the configurations of the openings of said cavities and said edge surfaces conforming in contour to the contour of the work-piece where pressed thereagainst, said shield and said work-piece being immersed in a chemical etchant whereby said cavities progressively receive chemically milled formations of said work-piece conforming in outline to said protected areas.

6. A chemical milling apparatus for milling raised integral formations on a metallic work-piece comprising a shield having a bodily movable member impervious to the effects of a chemical etchant, said member having a plurality of cavities, each open at but one end, said openings being of predetermined configurations, said member having wall portions defining said cavities, said wall portions being of different thickness at their outer ends and having edge surfaces at such outer ends, which edge surfaces are adapted to be pressed against said work-piece in surrounding relationship to areas thereof to be protected from chemical attack, such areas conforming in configurations to the configurations of the openings of said cavities and said edge surfaces conforming in contour to the contour of the work-piece where pressed thereagainst, said shield and said work-piece being immersed in a chemical etchant whereby said cavities progressively receive chemically milled formations of said work-piece conforming in outline to said protected areas.

7. A chemical milling apparatus for milling a metallic work-piece comprising a shield, said shield being a solid member impervious to the effects of a chemical etchant, said solid member having spaced apart vertical walls defining a cavity therebetween having an opening at but one end, said walls having peripheral edge surfaces adapted to be pressed against said work-piece in surrounding relationship to an area thereof to be protected from chemical attack, said area conforming in configuration to the configuration of said cavity opening and said edge surfaces conforming in contour to the contour of the work-piece where pressed thereagainst, said shield and said work-piece being immersed in a chemical etchant whereby said cavity is adapted to progressively receive a chemically milled formation of said work-piece conforming in outline to said protected area.

8. A chemical milling apparatus for milling a metallic work-piece comprising a shield, said shield being a solid member impervious to a chemical etchant, said solid member having wall portions, said wall portions arranged in predetermined relationship one to the other to define an area on the work-piece to be protected from chemical attack, edge surfaces on said wall portions adapted to be pressed against said work-piece in surrounding relationship to said defined area, and a surface portion of said solid member cooperating with said wall portions to define a cavity opening only to said defined area of said work-piece, said shield and said work-piece being immersed in a chemical etchant whereby said cavity receives a progressively increasing formation of said work-piece conforming in outline to said defined area, and conductor means connected to said cavity for introducing a fluid thereinto.

References Cited in the file of this patent

UNITED STATES PATENTS

| | | |
|---|---|---|
| 1,260,395 | Keller | Mar. 26, 1918 |
| 2,762,036 | Triman | Sept. 4, 1956 |
| 2,783,567 | Hull | Mar. 5, 1957 |
| 2,820,312 | Coontz | Jan. 21, 1958 |
| 2,883,275 | Hirdler | Apr. 21, 1959 |